Patented Nov. 15, 1938

2,136,650

UNITED STATES PATENT OFFICE 2,136,650

METALLIZED ACID POLYAZO DYES

Moses Leverock Crossley, Plainfield, and Lincoln Maurice Shafer, Highland Park, N. J., assignors to Calco Chemical Company, Inc., Bound Brook, N. J., a corporation of Delaware No Drawing. Application June 17, 1933, Serial No. 676,318

6 Claims. (Cl. 260—145)

This invention relates to new metallized azo dyes suitable for the production of colors of moderate to excellent fastness on animal fibers.

We have found that valuable fast acid dyes containing metal in a stable combination are obtained by metallizing the products formed by coupling a dihydroxyaryl compound, capable of combining with two molecules of a diazo compound in positions ortho to the two hydroxyl groups, with diazoaryl end-components, one or both of which contains a hydroxyl or carboxyl group ortho to the azo group, and at least one of which contains a sulfonic acid group. The dyes thus obtained may be represented by the general formula:

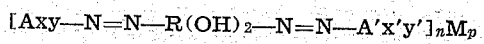

wherein $R(OH)_2$ represents a benzene or naphthalene nucleus or substituted nucleus containing two hydroxyl groups and being capable of having two molecules of diazo combine with it in positions ortho to the two hydroxyl groups.

A and A' represent aryl groups, such as benzene or naphthalene or substituted benzene and naphthalene groups.

$x$ represents OH or COOH in an ortho position to the azo group on the A nucleus.

$x'$ stands for H, OH, COOH, $SCH_2COOH$, Cl, $NO_2$, $NH_2$, $SO_3H$, or other substituents in an ortho position to the azo group on the A' nucleus.

$y$ and $y'$ represent one or more substituents on the A and A' nuclei in positions other than those ortho to the azo groups.

$n$ denotes the number of dye molecules in the complex.

M represents the metal or combination of metals in the complex, the preferred metals and combination of metals being: chromium, copper, iron, aluminum, nickel, tin, cobalt, cadmium, arsenic, boron, zinc, mercury, tungsten, manganese, zirconium, titanium, lead, molybdenum, antimony, tellurium, vanadium; and the combinations: chromium-copper, chromium-aluminum, chromium-manganese, chromium-cobalt, chromium-vanadium, copper-vanadium, chromium-nickel, chromium-iron, copper-zinc, chromium-titanium, chromium-tin, aluminum-tin, copper-iron combination of metals react with the dye to produce a product which is not identical with the mixture of the products obtained by treating portions of the dye with the separate metals. The metallic combination or complex enters into the dye molecule in some manner which is different from the reaction of a single metal. The precise form of chemical combination has not as yet been determined.

The ratio of the metal or metal complex to the dye may vary within wide limits, depending upon the nature of the metal and the number and nature of the metallizable groups in the dye molecule.

$p$ indicates the number of atoms of the metal or combination of metals in the metallized dye complex, which may vary from a fraction of a metal atom per dye molecule to several such atoms.

These dyes are produced by coupling a dihydroxyaryl compound, such as resorcinol or 1,5-dihydroxynaphthalene, with aryldiazo compounds, the coupling taking place ortho to both hydroxyls of the dihydroxyaryl compound.

With a dihydroxyaryl compound as middle component it is possible to produce a large number of complex dyes using end-components of varying composition, thus making it possible to produce dyes of varying complexity capable of giving several different complex metallic compounds when treated with metallizing agents.

When both end-components contain OH, or COOH, the resulting dyes have one pair of metallizable groups ortho to each of the azo groups; consequently, they are capable of forming complex metallic compounds of several different types with one or more metals in the complexes.

In a similar manner valuable complex metallized dyes are obtained by coupling diazo compounds ortho to both hydroxyl groups on the middle component with different end-components, only one of which contains a metallizable group, thus producing complex metallized dyes in each molecule of which there is one pair of metallizable groups ortho to one azo group and a single metallizable group ortho to the second azo and capable of being bridged by metal with another similar molecule.

The metallized products of this invention are formed by refluxing an aqueous solution of the dye with salts or other suitable compounds of the metals: chromium, copper, iron, aluminum, nickel, manganese, cobalt, cadmium, arsenic, tin, mercury, tungsten, zinc, zirconium, titanium, molybdenum antimony, tellurium, vanadium;

and combinations of metals, such as: chromium-copper, chromium-aluminum, chromium-manganese, chromium-cobalt, chromium-vanadium, copper-vanadium, chromium-nickel, chromium-iron, copper-zinc, chromium-titanium, chromium-tin and aluminum-tin, copper-iron. The mixture is refluxed for several hours and the resulting metallized dye salted out with sodium chloride. Boron while not strictly speaking a metal, reacts with the dye to produce a product having similar characteristics to the reaction product of the dye with true metals. It is, therefore, included as one of the elements which can be caused to enter into the dye.

In general these new dyes are dark colored powders which are quite soluble in water and are capable of producing valuable colors of varied tones, when dyed from an acid bath, on wool, silk, leather, and furs. The colors are of moderate to excellent fastness to light, washing, fulling, acid, alkalies and sea water. In particular, the fastness to light of many of the products is extraordinary, considering the fact that the corresponding unmetallized dyes produce colors which are comparatively fugitive to light.

While the products have valuable properties we find that there are differences in the dyes dependent upon the metal used. For example, we have found that when dyes of the class here described are metallized with chromium, copper, cobalt, and iron, extraordinary fastness to light is obtained. Excellent fastness to light is obtained when metallization is accomplished with nickel, zirconium, vanadium, aluminum and titanium. Excellent fastness to fulling is obtained when the dyes are metallized with the metals just mentioned. Combinations of two or more of these metals also gives excellent results and combinations may be made of one or more of these metals with one or more of the other metals set forth herein.

The mechanism of the metallizing reaction and the exact nature of the metal bonding in the dye molecules are unknown as yet but it would appear from the properties of the products that the metal is not present in the form of ordinary salts of the dyes, since it is not precipitated by inorganic bases.

The following examples are given to illustrate the invention. They do not in any way limit its scope. The parts given are by weight.

Example 1

Dissolve 10.9 parts of resorcinol and 42 parts of soda ash in 380 parts of water, then diazotize 24.6 parts of the sodium salt of Broenner's acid (2-aminonaphthalene-6-sulfonic acid) with 6.9 parts of sodium nitrite. Neutralize the excess free mineral acid in the diazo solution and add the diazo to the resorcinol solution, keeping the temperature below 15° C. When the coupling is complete, add to the yellowish orange solution a suspension of 19.9 parts of diazotized picramic acid, stirring the mixture thoroughly during the addition. It is desirable to have an excess of soda ash present at all times in order to complete the second coupling. Stir for several hours. The solution assumes a deep brown color. Heat to between 40 and 50° C. Salt out and filter off the precipitated dye. Dissolve the wet dye in 1000 parts of hot water and add 25 parts of chromium acetate in solution. Boil the mixture under reflux for about ten hours, filter, and salt out the metallized product by the addition of sodium chloride. Boron while not strictly speaking a metal, reacts with the dye to produce a product having similar characteristics to the reaction product of the dye with true metals. It is, therefore, included as one of the elements which can be caused to enter into the dye. The amount of sodium chloride necessary should be about ten percent of the volume. Cool the mixture and filter off the dye. A deep brown product is obtained. It dyes wool, leather, and silk deep tones of brown of excellent fastness.

Example 2

19.9 parts of picramic acid are suspended in 600 parts of water and diazotized with 22 parts of commercial 22° Bé. hydrochloric acid and 6.9 parts of sodium nitrite, keeping the temperature between 10 and 20° C. The diazo solution is added to a solution containing 11 parts of resorcinol in 450 parts of water and 42 parts of soda ash. The mixture is stirred until coupling is complete, then the diazo suspension, obtained by diazotizing 17.3 parts of sulfanilic acid with 6.9 parts of sodium nitrite, is added. The free mineral acid in the diazo solution must be previously neutralized. The mixture is stirred until the second coupling is complete. The solution must be distinctly alkaline throughout the coupling. After the coupling is complete, the mixture is stirred for about two hours and then the temperature is raised to between 50 and 60° C. The solution is then salted with sodium chloride and the dye filtered off. The resulting dye paste is dissolved in 800 parts of hot water and treated with a solution containing 22 parts of chromium fluoride and 22 parts of sodium formate. The mixture is boiled under reflux for 20 hours and then salt is added to precipitate the metallized dye. The dye is filtered and dried. It is a dark brown powder which is soluble in water, producing a reddish brown color. It dyes animal fibers neutral tones of brown of excellent fastness.

Example 3

The unmetallized dye paste obtained as in Example 2 is refluxed with 25 parts of copper sulfate crystals for about 2 hours. The copper dye is then salted out with sodium chloride, filtered and dried. It is a very soluble product which dyes animal fibers yellowish tones of brown. By substituting one of the following metals, similar results are obtained: Chromium, iron, aluminum, nickel, manganese, cobalt, cadmium, arsenic, tin, mercury, tungsten zinc, zirconium titanium, molybdenum, antimony, tellurium, vanadium. The colors obtained with copper and cobalt are similar. Manganese and chromium give redder tones of brown than copper. Varied tones of brown are obtained, depending on the metal or combination of metals used.

Example 4

14.3 parts of alphanaphthylamine is diazotized with 6.9 parts of sodium nitrite and the diazo solution added to a solution containing 11 parts of resorcinol, 8 parts of caustic soda, and 22 parts of soda ash. After stirring for a few hours, the coupling is complete and then a diazo solution, obtained from 23.5 parts of 6-nitro-2-amino-1-phenol-4-sulfonic acid, is added. After stirring for several hours, with the solution always maintained alkaline, the dye is salted out and the precipitate filtered off. The dye paste is then dissolved in 600 parts of hot water and mixed with a paste of freshly precipitated chromium hydroxide containing 22 parts of actual chromium hydroxide along with 10 parts of concentrated acetic acid. The mixture is boiled under reflux for about 12 hours, filtered, and the dye salted out with sodium chloride. The dye dissolves readily in water. It dyes animal fibers deep reddish tones of brown which are fast to light and washing.

Example 5

The diazo solution from 15.4 parts of 4-nitro-2-amino-1-phenol is added to a solution of 11 parts of resorcinol with 8 parts of caustic soda and 14 parts of soda ash. When the coupling is complete, the diazo solution from 20.8 parts of 4-chlor-3-sulfo-1-aniline (chlor metanilic acid) is added. The solution is kept alkaline with soda ash during the coupling and when the coupling is complete after stirring several hours, the temperature is raised to between 40 and 45° C. and the dye is salted out with sodium chloride. The precipitated dye is filtered and the dye paste is suspended in 600 parts of water and a solution containing 22 parts of chromium fluoride and 20 parts of sodium lactate is added. The mixture is boiled under reflux for about 18 hours, or boiled under pressure at about 110–115° C. for about 3 hours. The product is filtered and the solution treated with sodium chloride to salt out the metallized dye. The product dyes animal fibers reddish tones of brown of excellent fastness.

Example 6

11 parts of resorcinol and 30 parts of soda ash are added to 200 parts of water. The mixture is of water. The mixture is cooled and a diazo solution, obtained from 13.7 parts of anthranilic acid in 200 parts of water, is added. The mixture is stirred until coupling is complete, then 24.6 parts of sodium naphthionate is diazotized in the usual manner, the excess mineral acid neutralized, and the resulting diazo solution added to the monazo dye product. The mixture is stirred until the second coupling is complete. The dye is then salted out, filtered, and redissolved in about 800 parts of water. About 25 parts of cupric acetate is added and the mixture boiled for several hours. The solution is then salted out and the copper dye obtained. The product is soluble in water and dyes animal fibers medium tones of brown of excellent fastness. For the copper acetate, there may be substituted molecular equivalents of the following: Chromium acetate, cobalt chloride, ferrous sulfate, vanadium sulfate, potassium titanium oxalate, nickel acetate. In each case the corresponding metallized product is formed. The products are soluble in water and dye animal fibers yellowish to reddish tones of brown.

Example 7

15.9 parts of 1,5-dihydroxynaphthalene is suspended in 250 parts of water and 40 parts of soda ash added. The solution is cooled with ice and then mixed with the diazo product obtained from 22.1 parts of sodium picramate. The mixture is stirred until coupling is complete, then the diazo compound obtained from 17.3 parts of sulfanilic acid is added and the mixture stirred until the second coupling is complete. The reaction mixture is then acidified and the dye salted out. The dye is filtered and the dye paste suspended in 600 parts of water and treated with 25 parts of copper sulfate. The mixture is boiled for several hours. The resulting dye is salted out with sodium chloride. It is soluble in water and dyes animal fibers a medium tone of brown. Other metals of the list mentioned in the above specifications may be substituted for copper.

Example 8

11 parts of resorcinol is suspended in 250 parts of water and treated with 40 parts of soda ash. The mixture is cooled and treated with the diazo compound obtained from 22 parts of sodium picramate. The mixture is stirred until coupling is complete, then the diazo compound obtained by diazotizing 30.3 parts of amido G salt is added and the mixture stirred until the second coupling is complete. The dye is then salted out and filtered. The dye paste is then dissolved in 600 parts of water and treated with 12.5 parts of copper sulfate crystals—an amount of copper salt equivalent to ½ mole of copper for 1 mole of dye. The mixture is boiled for several hours and the dye salted out, filtered and dried. The product is soluble in water. It dyes animal fibers tones of brown of exceptional fastness to light. Other metals of the above described series may be substituted for copper and similar results obtained.

Example 9

11 parts of resorcinol and 45 parts of soda ash are added to 250 parts of water, the solution cooled and mixed with the diazo product obtained from 18.8 parts of ortho-aminophenol-parasulfonic acid. The mixture is stirred until coupling is complete. It is then treated with the diazo product obtained from 12.1 parts of mixed xylidine. The mixture is stirred for several hours until the coupling is complete and the dye salted out and filtered. The dye paste is then suspended in 700 parts of water and treated with 27.1 parts of chromium fluoride, $CrF_3 \cdot 9H_2O$, and 25 parts of copper sulfate crystals, $CuSO_4 \cdot 5H_2O$. The mixture is boiled for several hours. The resulting complex metallized dye is salted out with sodium chloride, filtered and dried. It is soluble in water and dyes animal fibers from an acid bath brown tones of exceptional light fastness. In a similar way, other metallic complexes of the series mentioned in the above specifications may be used and similar results obtained. The following complexes are particularly suitable as substitutes for the chromium copper complex: Chromium-aluminum, chromium-manganese, chromium-cobalt, chromium-vanadium, chromium-nickel, chromium-iron, copper-nickel, copper-vanadium, copper-cobalt, chromium-titanium, chromium-tin.

Example 10

Dissolve 11 parts of resorcinol and 30 parts of soda ash in 200 parts of water, cool the mixture and add to it a diazo suspension, obtained from 19.9 parts of picramic acid, stir until coupling is complete, then add the diazo compound, obtained from 19 parts of 2-aminophenol-4-sulfonic acid, stir until the coupling is complete, maintaining the solution alkaline throughout the coupling. Salt out the dye. Filter. Suspend the dye paste in about 600 parts of water, add 25 parts of manganese chloride and 25 parts of chromium acetate and boil for several hours. Salt out the resulting dye, filter, and dry. The product is soluble in water and dyes animal fibers deep reddish brown tones of excellent fastness to light. The following table exhibits types of dye molecules which are metallized according to this invention to produce new and valuable products:

| First component | Middle component | Second component | Color produced on wool by metallized dyes | | | | |
|---|---|---|---|---|---|---|---|
| | | | Chromium | Copper | Iron | Cobalt | Nickel |
| 4-nitro-2-amino-1-phenol | Resorcinol | Laurent's acid | Medium brown | Yellowish brown | Greenish brown | Yellowish brown | Medium brown. |
| Picramic acid | ...do... | 4-sulfo-2 nitro-1-aniline | Reddish brown | Medium brown | ...do... | Reddish brown | Reddish brown. |
| Amino azo benzene sulphonic acid | ...do... | Picramic acid | ...do... | ...do... | ...do... | ...do... | Do. |
| Alphanaphthyl-amine | ...do... | 6 nitro-4 sulfo-2-amino 1-phenol | ...do... | ...do... | ...do... | ...do... | Do. |
| 4-chlor-6-sulfo-2-amino 1-phenol | ...do... | Paranitraniline | Medium brown | Yellowish brown | ...do... | Brown | Medium brown. |
| Picramic acid | 1:5 dihydroxy-naphthalene | 1-amino-2-naphthol 4 sulfonic acid | Medium brown | Brown | Brown | ...do... | Brown. |
| Do | ...do... | 1-amino-phenyl 4 sulfonic acid | Brown | ...do... | ...do... | ...do... | Do. |

Altho we have described our invention setting forth a number of examples thereof, these examples are illustrative only and do not at all limit the invention. There are large numbers of compounds which may be made in accordance with the principle herein set forth and the above named compounds give an indication of the large variety of possible compounds which this invention contemplates. Our invention is therefore to be broadly construed and not to be limited except by the claims appended hereto.

In the claims the expression "single carbocyclic nucleus" is used to cover aromatic compounds having one or more carbocyclic rings, which form a single nucleus and are not rings joined together either by straight carbon chains or through heterocyclic groups. Thus, for example, naphthalene containing two carbocyclic rings condensed together, would fall under the definition of the above term, whereas, diphenyl in which two carbocyclic rings are joined with a single bond or naphthazene in which rings are joined through nitrogen groups, would not be covered by the above term. This definition of the term, "single carbocyclic nucleus" will be strictly adhered to in the claims and wherever the expression appears in the claims it will have no other meaning.

What we claim is:

1. As new products the water soluble complex metallized compounds of the dye of the general formula:

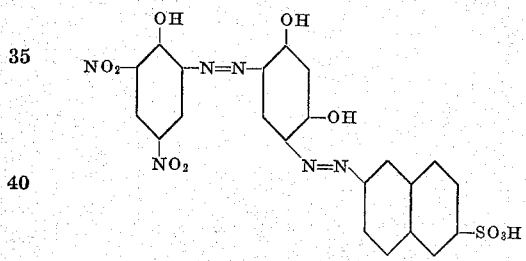

which constitute dark colored powders, soluble in water, and dye animal fibers varied tones of brown.

2. As new products the water soluble complex metallized compounds of the dye of the general formula:

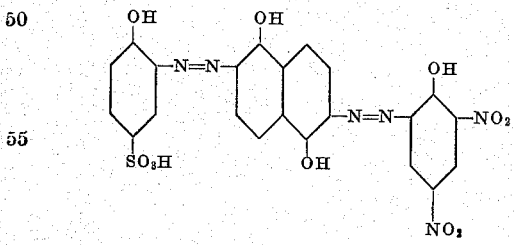

3. The complex copper compounds of the trisazo dyestuffs of the general formula

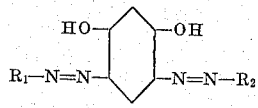

wherein $R_1$ is a radical of an ortho diazophenol and $R_2$ is a radical of a diazotized amino compound of the azobenzene series, said compounds being capable of dyeing leather brownish tints.

4. The complex copper compounds of the trisazo dyestuffs of the general formula

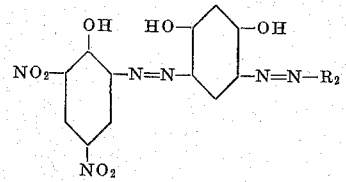

wherein $R_2$ is a radical of a diazotized amino compound of the azobenzene series, said compounds being capable of dyeing leather brownish tints.

5. The complex copper compounds of the trisazo dyestuffs of the general formula

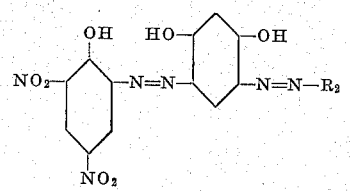

wherein $R_2$ represents a radical of a diazotized 4-amino 4'-sulfonic acid-azobenzine.

6. As new products, water-soluble complex metallized compounds of poly azo dyes containing an aryl middle component included in the group consisting of single ring phenols having two phenolic hydroxyls and two ring phenols having two phenolic hydroxyls said component being linked to aryl end components by azo groups, at least one of the end components having an hydroxy group ortho to the azo group linking the said end component to the middle component, and at least one end component containing at least one nitro group.

MOSES L. CROSSLEY.
LINCOLN M. SHAFER.

Certificate of Correction

Patent No. 2,136,650.                                November 15, 1938.

MOSES LEVEROCK CROSSLEY ET AL.

It is hereby certified that errors appear in the printed specification of the above numbered patent requiring correction as follows: Page 1, second column, line 55, after the word "molybdenum" insert a comma; page 2, second column, line 56, after "tungsten" insert a comma; line 57, after "zirconium" insert a comma; page 3, first column, lines 39 and 40, strike out the words and period "The mixture is of water."; page 4, first column, lines 8 to 14, inclusive, for the formula

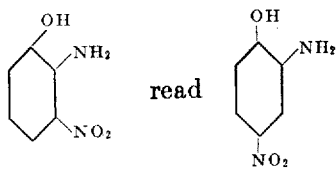

and that the said Letters Patent should be read with these corrections therein that the same may conform to the record of the case in the Patent Office.

Signed and sealed this 10th day of January, A. D. 1939.

[SEAL]                             Henry Van Arsdale

*Acting Commissioner of Patents.*